(12) United States Patent
Choi

(10) Patent No.: US 10,485,322 B2
(45) Date of Patent: Nov. 26, 2019

(54) COSMETIC COMPOSITION APPLICATOR COMPRISING IMPERMEABLE LAYER

(71) Applicant: AMOREPACIFIC CORPORATION, Seoul (KR)

(72) Inventor: Jung Sun Choi, Yongin-si (KR)

(73) Assignee: AMOREPACIFIC CORPORATION, Seoul (KR)

(*) Notice: Subject to any disclaimer, the term of this patent is extended or adjusted under 35 U.S.C. 154(b) by 88 days.

(21) Appl. No.: 15/558,806

(22) PCT Filed: Mar. 16, 2016

(86) PCT No.: PCT/KR2016/002625
§ 371 (c)(1),
(2) Date: Sep. 15, 2017

(87) PCT Pub. No.: WO2016/148495
PCT Pub. Date: Sep. 22, 2016

(65) Prior Publication Data
US 2018/0070700 A1    Mar. 15, 2018

(30) Foreign Application Priority Data

Mar. 17, 2015  (KR) .................. 10-2015-0036538
Mar. 15, 2016  (KR) .................. 10-2016-0031114

(51) Int. Cl.
*A45D 34/04* (2006.01)
*B32B 5/18* (2006.01)
*B32B 25/10* (2006.01)

(52) U.S. Cl.
CPC ...... *A45D 34/04* (2013.01); *A45D 2200/1018* (2013.01); *B32B 5/18* (2013.01); *B32B 25/10* (2013.01)

(58) Field of Classification Search
CPC ............ A45D 34/04; A45D 2200/1018; A45D 34/00; A45D 34/042; A45D 37/00;
(Continued)

(56) References Cited

U.S. PATENT DOCUMENTS 6,006,761 A * 12/1999 Meledandri ............ A45D 33/34
                                                      132/317
2004/0011377 A1  1/2004 Michel et al.

FOREIGN PATENT DOCUMENTS

JP            67608 U     2/1994
KR      20020096039 A    12/2002
(Continued)

OTHER PUBLICATIONS

International Search report for PCT/KR2016/002625, dated Jun. 22, 2016 (4 pages with translation).
Taiwanese Search Report dated Mar. 17, 2015, 1 pp.

*Primary Examiner* — David J Walczak
(74) *Attorney, Agent, or Firm* — Cantor Colburn LLP

(57) ABSTRACT

A cosmetic composition applicator includes an impermeable layer. An application layer of a cosmetic composition applicator absorbs the cosmetic composition, but a flexible layer may block the cosmetic composition so that the cosmetic composition is not absorbed. Thus, moisture durability may be procured, flexibility and comfortability of the applicator may be continuously procured, and since the absorption of liquid contents into the cosmetic composition applicator is suppressed, the rate of transmission to skin may be enhanced.

8 Claims, 1 Drawing Sheet

(58) Field of Classification Search
CPC ...... A45D 2200/10; B32B 5/18; B32B 25/10;
B32B 5/20; B32B 5/22; B32B 5/24;
B32B 5/245; B32B 5/28; B32B 5/32;
B32B 25/04; B32B 25/045
See application file for complete search history.

(56) References Cited

FOREIGN PATENT DOCUMENTS

| KR | 101323495 B1 | 10/2013 |
|---|---|---|
| KR | 1020130122560 A | 11/2013 |
| KR | 101470548 B1 | 12/2014 |
| KR | 101476224 B1 | 12/2014 |

* cited by examiner

[Fig. 1]
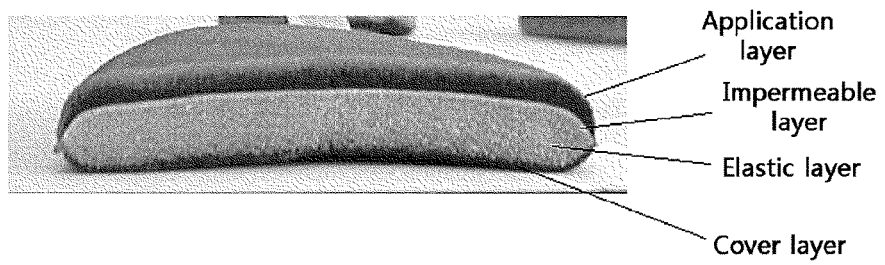
[Fig. 2]
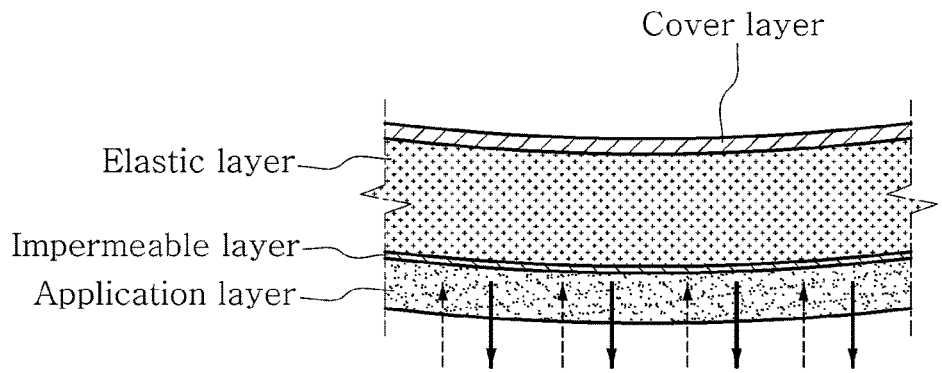

* COSMETIC COMPOSITION APPLICATOR COMPRISING IMPERMEABLE LAYER

TECHNICAL FIELD

The present disclosure relates to a cosmetic composition applicator.

BACKGROUND ART

As the use of portable liquid cosmetic compositions and cosmetic composition applicators increases, convenient-to-use applicators are sought for. The existing portable container-type applicators are disadvantageous in that cosmetic effect decreases with time because the elasticity and pleasantness of the applicator decrease.

In a pact-type container that can hold a cosmetic composition conveniently, thinly processed sponge is provided to allow for easy application or fixing of makeup. The cosmetic composition applicator provided in the container is contaminated by oils, moisture, sebum and dusts during use and is often kept for a long time inside the container. In particular, the compatibility between a low-viscosity cosmetic composition and the applicator affects the life span of the cosmetic composition applicator.

In general, a cosmetic composition applicator may be composed of an application layer formed of a foam having fine pores for providing suitable cosmetic effect, an elastic layer formed of a foam for allowing for good application and adhesion of makeup and a cover layer for preventing contamination of hands. The foam may be a porous foam and may be in various types depending on degree of foaming, method of foaming, etc. The foam may be divided into one suitable for application and one suitable as a support. The foam absorbs contents. In particular, liquid contents of low viscosity are absorbed well. The cosmetic composition applicator including the elastic layer has good elasticity and provides pleasant feeling initially. However, the elasticity decreases as the foam gradually absorbs contents and, as a result, the pleasant feeling may also decrease. As the foam of the elastic layer, ester-based polyurethane is used primarily. However, the ester-based polyurethane is susceptible to moisture. Although ether-based polyurethane is resistant to moisture, it has the problem that sealing by thermal processing is impossible.

REFERENCES OF RELATED ART

Patent Documents

Korean Patent Publication No. 2013-0122560.

DISCLOSURE

Technical Problem

The present disclosure is directed to providing a cosmetic composition applicator capable of improving cosmetic effect by increasing the delivery ratio of a cosmetic composition to skin and maintaining soft touch, elasticity and pleasant feeling due to suppressed absorption of the cosmetic composition into the cosmetic composition applicator.

Technical Solution

In an aspect, the present disclosure provides a cosmetic composition applicator including an impermeable layer.

Advantageous Effects

A cosmetic composition applicator of the present disclosure is designed such that a cosmetic composition is absorbed by an application layer but not by an elastic layer. Through this, durability can be ensured against moisture and the elasticity and pleasantness of the applicator can be maintained. In addition, the delivery ratio of the cosmetic composition to skin can be improved by suppressing the absorption of the liquid cosmetic composition into the cosmetic composition applicator.

BRIEF DESCRIPTION OF DRAWINGS

FIG. 1 shows a cross-sectional image of a cosmetic composition applicator including an impermeable layer according to an exemplary embodiment of the present disclosure.

FIG. 2 shows a cross-sectional image of a cosmetic composition applicator including an impermeable layer according to an exemplary embodiment of the present disclosure. The arrows indicate the absorption and discharge of a cosmetic composition.

BEST MODE

In the present disclosure, an "applicator" refers to a tool for delivering any material or substance to skin. The term is used in the broadest concept, including any means of application such as a puff, a tip, a brush, etc.

In the present disclosure, a "foam" refers to a substance formed by foaming and then solidifying polyurethane, rubber, plastic, etc.

In the present disclosure, "absorption ratio" refers to the degree of any material or substance absorbed at once by an applicator, etc. It is desired that the absorbed amount is neither too much nor too little.

In the present disclosure "delivery ratio" refers to the degree of any material or substance effectively delivered from an applicator to an object.

Hereinafter, specific exemplary embodiments of the present disclosure are described in detail such that those of ordinary skill in the art to which the present disclosure belongs can easily carry out the present disclosure.

In an aspect, the present disclosure provides a cosmetic composition applicator including an impermeable layer.

Specifically, the cosmetic composition applicator according to an exemplary embodiment of the present disclosure may include an application layer, an impermeable layer which contacts the lower side of the application layer and an elastic layer which contacts the lower side of the impermeable layer. In addition, it may further include a cover layer which contacts the lower side of the elastic layer.

In an exemplary embodiment of the present disclosure, the application layer is a layer which contacts a cosmetic composition (hereinafter, also referred to as contents) directly and delivers and applies the cosmetic composition onto skin. The elastic layer is a layer which creates the feeling of the cosmetic composition applicator and provides elasticity so that the cosmetic composition is applied and adhered onto skin. The cover layer, also called a contamination-preventing layer, is a layer which prevents the contamination of hands and the applicator when the cosmetic composition applicator is held with hands.

In an exemplary embodiment of the present disclosure, the impermeable layer which suppresses the absorption of the cosmetic composition (contents) is introduced between the application layer and the elastic layer, thereby providing an applicator that can maintain the elasticity and pleasant feeling of the applicator by suppressing the absorption of the contents into the elastic layer and the cover layer.

In an exemplary embodiment of the present disclosure, the cosmetic composition applicator may be one in which one side of the application layer is formed integrally with the impermeable layer. For example, the lower side of the application layer and the impermeable layer may be the same. In an exemplary embodiment, the impermeable layer and the application layer may be prepared without additional processing by preparing and foaming the application layer on the impermeable layer. If the application layer is formed integrally with the impermeable layer as described above, the cosmetic composition is absorbed through the upper side of the application layer but cannot penetrate the lower side.

In an exemplary embodiment of the present disclosure, the impermeable layer is located between the application layer and the elastic layer and may be formed of a material that can be joined through thermal sealing processing.

In an exemplary embodiment of the present disclosure, the impermeable layer may have a thickness of 0.01-3.0 mm. When the thickness is within the above range, a strong joint is formed at the edge of the applicator due to superior processability. At the same time, the applicator has soft feeling and provides improved cosmetic effect due to good adhesion to skin.

In an exemplary embodiment, the impermeable layer may have a tensile strength of 2-10 kg/cm$^3$ and an elongation percentage of 200% or greater.

In an exemplary embodiment of the present disclosure, the impermeable layer may include an impermeable film made from one or more material selected from a group consisting of polyurethane, silicone, polyethylene, polypropylene, polyolefin, acrylonitrile butadiene rubber (NBR), polyvinyl chloride, ethylene-vinyl acetate butyl rubber (EVA), styrene-isoprene-styrene (SIS), styrene-ethylene-butylene-styrene (SEBS), polyvinyl alcohol (PVA), nitrile rubber, butyl rubber, chloroprene rubber (Neoprene®) and polyester or a polymer of the material.

In an exemplary embodiment of the present disclosure, the impermeable layer may have a closed cell structure or a microporous cell structure. A closed cell structure or a microporous cell structure with no cells cannot absorb a liquid material.

In an exemplary embodiment of the present disclosure, the application layer may contain a foam. Specifically, the application layer may contain a foam prepared from one or more selected from a group consisting of polyester, acrylonitrile butadiene rubber (NBR), styrene-butadiene rubber (SBR), natural rubber (NR), polyvinyl chloride, polyethylene, ethylene-vinyl acetate butyl rubber (EVA), latex, silicone, styrene-isoprene-styrene (SIS), styrene-ethylene-butylene-styrene (SEBS), polyvinyl alcohol (PVA), nitrile rubber, butyl rubber, chloroprene rubber (Neoprene®), polyolefin and polyurethane, although not being specially limited thereto. The foam prepared from silicone may be one prepared from a silicone-based elastomer. The polyurethane may be specifically wet-type polyurethane, more specifically one of polyester-based polyurethane, polyether-based polyurethane and polyester-polyether-blended polyurethane.

In an exemplary embodiment, the foam may comprise a membrane foam or a flock foam. In an exemplary embodiment of the present disclosure, the membrane foam is a polymer foam such as rubber, polyvinyl or polyurethane coated with a membrane and usually has a smaller cell size than the foam before the membrane coating. In an exemplary embodiment of the present disclosure, the flock foam is a polymer foam to which a fiber has been attached. The fiber may be one or more selected from a group consisting of cotton, acryl, polyamide, nylon, polyester, silk and rayon. Specifically, it may be cotton, acryl, polyamide, nylon, polyester, silk, cotton mixed with acryl, cotton mixed with rayon, nylon mixed with polyester mixed with cotton or acryl mixed with polyester.

In an exemplary embodiment of the present disclosure, the layers of the applicator may be fused with each other. The fusing method is not particularly limited and includes thermal sealing, laser fusion, ultrasonic fusion, high-pressure fusion, etc.

In an exemplary embodiment of the present disclosure, the applicator may be thermally sealed at 100-300° C., specifically at 130-250° C. That is to say, the impermeable layer may be made from a material that can be thermally sealed (joined) at 100-300° C., specifically at 130-250° C. In the present disclosure, all of the application layer, the impermeable layer, the elastic layer and the cover layer may be joined by thermal sealing.

In an exemplary embodiment, the application layer is a layer which delivers and applies a cosmetic composition onto skin and the cosmetic composition is absorbed in the application layer. Meanwhile, because the cosmetic composition is not absorbed in the impermeable layer, the cosmetic composition is not absorbed inside the applicator except for the application layer. That is to say, the cosmetic composition absorbed in the application layer is not absorbed further into the applicator and, accordingly, the amount of the cosmetic composition delivered to skin is increased.

In an exemplary embodiment of the present disclosure, the elastic layer may be formed of a polyurethane foam, specifically a dry-type polyurethane foam, more specifically a polyester-based polyurethane foam, although not being particularly limited thereto. The elastic layer may be formed of a foam having about 100 pores per inch (ppi).

In an exemplary embodiment of the present disclosure, the cover layer may be formed of a polyurethane film, specifically a wet-type polyurethane film, although not being particularly limited thereto.

In an exemplary embodiment of the present disclosure, the applicator is not particularly limited as long as it is one which delivers a cosmetic composition to skin. For example, it may be a puff.

In an exemplary embodiment of the present disclosure, the cosmetic composition may be a liquid cosmetic composition, although not being particularly limited thereto.

In an exemplary embodiment of the present disclosure, the cosmetic composition may be a solution, an emulsion or a suspension, although not being limited thereto.

In an exemplary embodiment of the present disclosure, the cosmetic composition may be an emulsion, specifically a water-in-oil (W/O) or oil-in-water (O/W) emulsion, or a dispersion, specifically an oily or aqueous dispersion.

In an exemplary embodiment of the present disclosure, the cosmetic composition may be formulated as, for example, a makeup primer, a makeup base, a liquid or high-viscosity foundation, a twin cake, a concealer, a lipstick, a lip gloss, a powder, a lip liner, an eyebrow, an eye liner, an eye shadow, a blusher, a sunscreen, a lotion, a cream, an essence, etc., although not being limited thereto.

The cosmetic composition applicator according to an aspect of the present disclosure may be provided in a container commonly called a pact, which includes a puff as the cosmetic composition applicator, a lower part that can accommodate it and an upper part having a lid to which a mirror can be attached.

In an aspect, the present disclosure provides a cosmetic composition applicator wherein the contents are prevented from being absorbed in the elastic layer and are absorbed only in the application layer and discharged therefrom. Because the contents are not absorbed into the cosmetic composition applicator, the problem of decrease in the amount of the contents or unpleasant feeling due to moisture can be solved. As a result, a cosmetic composition applicator which always maintains soft touch and elasticity and provides superior delivery to skin can be provided.

MODE FOR INVENTION

Hereinafter, the present disclosure will be described in detail through examples. However, the following examples are for illustrative purposes only and it will be apparent to those of ordinary skill in the art that the scope of the present disclosure is not limited by the examples.

[Preparation Example 1] Preparation of Cosmetic Composition

A cosmetic composition (foundation) containing oily ingredients, emulsifiers, an organic or inorganic sun screening agent, pigments and aqueous ingredients was prepared as described in Table 1. The cosmetic composition had a viscosity of 28,000 cps (centipoise). The viscosity was measured using a Brookfield viscometer (Brookfield RVDV-III Ultra; Serial No. RY6521152) set to a spindle number 63 and a spindle speed 5 rpm or to a spindle number 64 and a spindle speed 12 rpm.

TABLE 1

| | | ingredients | wt % |
|---|---|---|---|
| Oily Part | Oily ingredients | Ozokerite | 1.0 |
| | | Dicaprylyl carbonate | 10.00 |
| | Sun screening agent | Octyl methoxycinnamate | 7.000 |
| | Thickener | Disteardimonium hectorite | 1.50 |
| | Oily ingredient | Decamethylcyclopentasiloxane | 16.00 |
| | Emulsifiers | Sorbitan sesquioleate | 2.000 |
| | | Lauryl PEG/PPG-18/18 methicone | 1.500 |
| | Pigments | Polymethyl methacrylate | 5.00 |
| | | Titanium dioxide/iron oxide | 7.00 |
| Aqueous Part | | Water | To 100 |
| | Emulsification stabilizer | Salt | 1.00 |
| | Humectant | Glycerin | 8.00 |
| | | Flavor | 0.2 |
| | | Total | 100 |

[Test Example 1] Absorption of Contents of Applicator Including Impermeable Layer After loading 15 g of liquid contents (cosmetic composition) in an applicator (puff) without an impermeable layer (Comparative Example 1) or an applicator (puff) including an impermeable layer (Example 1), the absorption degree of the contents was compared by measuring the maximum absorption weight. The delivery ratio of the contents was calculated as follows. The result is shown in Table 2.

Delivery ratio of contents=Amount of contents applied on skin (g)/amount of contents loaded in applicator (g)×100     [Equation 1]

The applicators of Comparative Example 1 and Example 1 were identical in the constitution of an application layer, an elastic layer and a cover layer, except for the impermeable layer. Specifically, the application layer was formed of a wet-type polyurethane foam with a cell size of 100-200 μm. The impermeable layer was formed of a cell-free polyurethane sheet with a thickness of 10-100 μm. The elastic layer was formed of a dry-type polyurethane foam with a thickness of 2.5-4.5 mm and a cell size of 250-400 μm, having many large-sized pores. The cover layer was formed of a polyurethane sheet with a thickness of 0.3-1.5 mm to prevent contamination of hands and slipping on palms. As the hardness of the applicator, "Asker F hardness" was measured using an Asker durometer (type F) before the absorption of the composition in the applicator.

TABLE 2

| | Comparative Example 1 | Example 1 |
|---|---|---|
| Application layer | Polyurethane | Polyurethane |
| Impermeable layer | — | Polyurethane |
| Elastic layer | Polyurethane | Polyurethane |
| Cover layer | Polyurethane | Polyurethane |
| Hardness | 56 | 58 |
| Absorption amount of foundation | 9.7 g | 4.3 g |
| Delivery ratio of contents | 27.6% | 40.2% |

From Table 2, it can be seen that the applicator including the impermeable layer exhibits a low absorption ratio and the contents are not absorbed in the elastic layer.

[Test Example 2] Determination of Thickness of Impermeable Layer

The effect of the thickness of the impermeable layer was tested. Cosmetic effect, feeling and processability were evaluated depending on the thickness of the impermeable layer. The result is shown in Table 3.

The applicators of Examples 2-5 and Comparative Example 2 are the same as that of Example 1, except for the thickness of the impermeable layer.

TABLE 3

| | Ex. 2 | Ex. 3 | Ex. 4 | Ex. 5 | Comp. Ex. 2 |
|---|---|---|---|---|---|
| Application layer Thickness | Polyurethane 1.0 mm | Polyurethane 1.0 mm | Polyurethane 1.0 mm | Polyurethane 1.0 mm | Polyurethane 1.0 mm |
| Impermeable layer Thickness | Polyurethane 0.01 mm | Polyurethane 1 mm | Polyurethane 2 mm | Polyurethane 3 mm | Polyurethane 4 mm |
| Elastic layer Thickness | Polyurethane 4.0 mm | Polyurethane 4.0 mm | Polyurethane 4.0 mm | Polyurethane 4.0 mm | Polyurethane 4.0 mm |
| Cover layer Thickness | Polyurethane 1.0 mm | Polyurethane 1.0 mm | Polyurethane 1.0 mm | Polyurethane 1.0 mm | Polyurethane 1.0 mm |

TABLE 3-continued

|  | Ex. 2 | Ex. 3 | Ex. 4 | Ex. 5 | Comp. Ex. 2 |
|---|---|---|---|---|---|
| Hardness | 67 | 68 | 70 | 70 | 69 |
| Cosmetic effect | Soft and good adhesion | Soft and good adhesion | Soft and good adhesion | Soft and good adhesion | Poor adhesion |
| Feeling | Soft | Soft | Soft | Soft | Tough |
| Processability | Good | Good | Good | Good | Poor processability |

As described in Table 3, the joint at the edge of the applicator was weak when the thickness of the impermeable layer was greater than 3.0 mm because of poor processability. Also, the applicator was tough and the cosmetic effect was unsatisfactory because of poor adhesion to skin. Accordingly, it is desired that the impermeable layer has a thickness of 0.01-3.0 mm.

When the thickness of the impermeable layer is 0.01-3.0 mm, the durability of the applicator can be ensured against the contents. Because the impermeable layer prevents the absorption of the contents into the applicator, the elasticity and pleasantness of the applicator can be maintained. In addition, the amount of the contents delivered from the applicator to skin is improved.

The invention claimed is:

1. A cosmetic composition applicator comprising an application layer, an impermeable layer which contacts a lower side of the application layer, an elastic layer which contacts a lower side of the impermeable layer, and a contamination-preventing layer which contacts a lower side of the elastic layer,
wherein the impermeable layer has a thickness of 0.01-3.0 mm, and
wherein the contamination-preventing layer is formed of a polyurethane film.

2. The cosmetic composition applicator according to claim 1, wherein the impermeable layer has a tensile strength of 2-10 kg/cm$^3$.

3. The cosmetic composition applicator according to claim 1, wherein the impermeable layer has an elongation percentage of 200% or greater.

4. The cosmetic composition applicator according to claim 1, wherein the impermeable layer comprises an impermeable film made from one or more material selected from a group consisting of polyurethane, silicone, polyethylene, polypropylene, polyolefin, acrylonitrile butadiene rubber (NBR), polyvinyl chloride, ethylene-vinyl acetate butyl rubber (EVA), styrene-isoprene-styrene (SIS), styrene-ethylene-butylene-styrene (SEBS), polyvinyl alcohol (PVA), nitrile rubber, butyl rubber, chloroprene rubber (Neoprene®) and polyester or a polymer of the material.

5. The cosmetic composition applicator according to claim 1, wherein the impermeable layer comprises a closed cell structure or a microporous cell structure.

6. The cosmetic composition applicator according to claim 1, wherein the applicator is thermally sealed at 100-300° C.

7. The cosmetic composition applicator according to claim 1, wherein a cosmetic composition is absorbed in the application layer but not absorbed in the impermeable layer.

8. The cosmetic composition applicator according to claim 7, wherein the cosmetic composition is a liquid cosmetic composition.

* * * * *